July 3, 1928.

B. BORLAND

SEAL

Filed March 17, 1927

1,675,328

Inventor:
Bruce Borland
By Glenn S. Noble
Atty.

Patented July 3, 1928.

1,675,328

UNITED STATES PATENT OFFICE.

BRUCE BORLAND, OF CHICAGO, ILLINOIS.

SEAL.

Application filed March 17, 1927. Serial No. 176,030.

I have heretofore manufactured and sold car seals made of metallic strips having holes punched in one end and integrally formed buttons or projections at the opposite ends which are passed through the holes and then headed or riveted over by means of a seal press. The buttons or projections are made approximately cylindrical for a short distance with curved or approximately hemispherical tops or ends. It has been found that in using these devices, occasionally the flat end with the hole therethrough is not fully pressed down over the button or projection, so that instead of the button being riveted over the adjacent surface of the coacting end, the button will be flattened down with only a portion thereof projecting into the hole, and the ends may be more or less readily separated so that the device is not properly sealed. In order to overcome such possible improper sealing of these devices, I have provided the novel construction forming the subject matter of this application. In accordance with the present invention, I provide a seal having the ends so constructed that the sealing or locking portions will be brought into proper position before any riveting action takes place.

The objects of this invention are to provide an improved seal which will be particularly cheap in construction and which is provided with fastening means whereby a proper locking or sealing is insured; to provide a seal having a locking button at one end and a concave or depressed portion at the other end with a hole there for receiving the button; to provide a seal of the character indicated having means whereby the ends will be pressed together before the rivet is spread to fasten the ends; and to provide such further advantages and novel features of construction as will appear more fully hereinafter.

In the accompanying drawings illustrating this invention,

Figure 1:
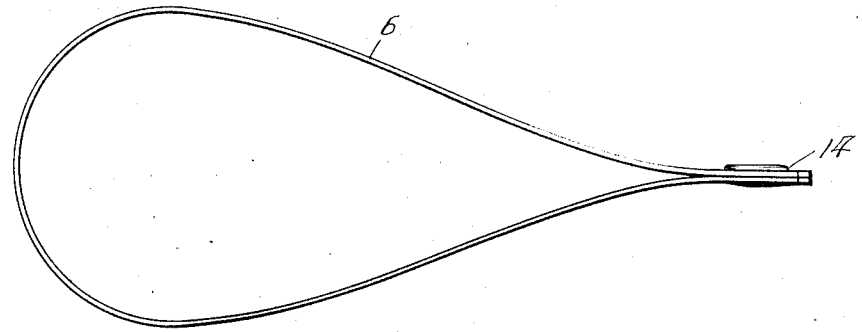
Figure 1 is a side view of my improved seal.
Figure 2:
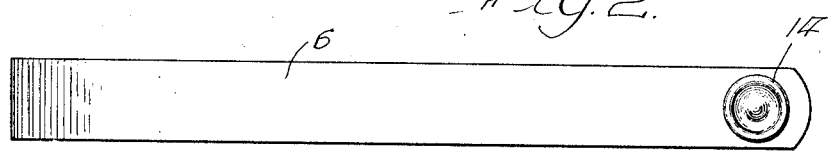
Figure 2 is a plan view of the same.
Figure 3:
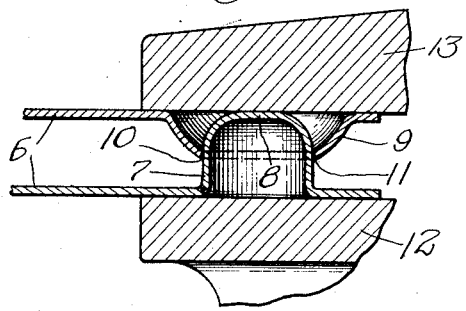
Figure 3 is an enlarged sectional detail showing the ends in position in the press preparatory to fastening.
Figure 4:
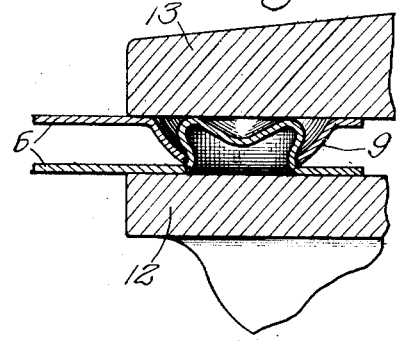
Figure 4 is a view similar to Figure 3 showing the parts after the press is partly closed; and
Figure 5:
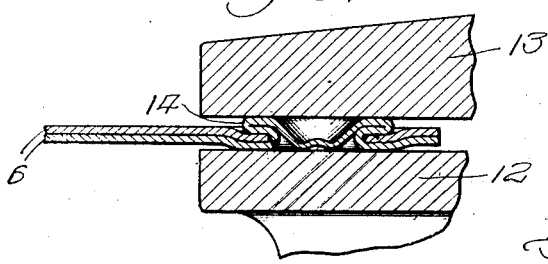
Figure 5 is a similar view showing the completed rivet or fastening.

It will be understood that these seals are made of very thin metal, such as sheet steel or tin, the commercial form being approximately three-eighths of an inch wide, and the views shown in the drawings are necessarily enlarged for convenience in illustration. The seal comprises a metallic strip 6 having a button or projection 7 at one end thereof which is preferably formed integrally. In the preferred construction, this projection is made cylindrical for a short distance from the strip, and the closed end 8 is rounded or hemispherical, as shown particularly in Figure 3. The opposite end of the strip has a concave or approximately conical protuberance or hump 9 having a hole 10 therethrough which is adapted to fit closely over the button 7. When the parts are brought together to fastening position, as shown in Figure 3, the protuberance extends downwardly so that its lower edge 11 which forms the periphery of the hole 10 extends beyond the rounded upper portion of the button or rivet 7. It will be seen that if the user fails to press the ends together when they are placed between the jaws 12 and 13 of the seal press, the jaws will first force the ends to this position. As the jaws close or are pressed together, the protruding or bulging portion 9 will be forced toward the opposite end so that when the riveting action commences, as shown in Figure 4, the lower edge 11 will be pressed to the base of the cylindrical portion and into engagement with the opposite face of the adjacent end of the seal. The continued closing of the jaws causes the end of the projection or button 7 to be formed into a head 14, as shown in Figure 5, which projects out over the surface of the opposite end around the hole 10. At the same time, the crushing or pressing down of the protuberance 9 causes the edge 11 to be pressed inwardly against the button around the entire periphery thereof, which further increases the positive fastening of the ends together.

On account of this novel construction, the action of the jaws will force the ends into proper position for sealing so that it is practically impossible to make an improper fastening or seal.

Having thus described my invention, what I claim and desire to secure by Letters Patent is:

1. A seal of the character set forth, comprising a thin strip of metal having an integrally formed projection adjacent to one end thereof, said projection being approximately cylindrical with a rounded end, said seal also having an integrally formed protuberance adjacent to the opposite end, with a hole therethrough, said protuberance extending toward the projection when in engaging position, the height of the protuberance being approximately equal to the height of the rounded end of the projection.

2. A seal comprising a strip of metal with a stud at one end and having a depression spaced therefrom and facing the stud, said depression having a hole to receive the stud and being of sufficient depth relative to the stud so that proper positioning of the depression will be insured when compression takes place to cause the stud to spread over the depression and the depression flattened.

3. A seal comprising a strip of metal with a button at one end and a depression at the other end having a hole in the bottom thereof, the periphery of which rests against the outer surface of the button adjacent to the strip when in engaging position, said depression projecting from the surface of the strip a sufficient distance to cause spreading of the stud above the periphery of the hole instead of below the same.

BRUCE BORLAND.